United States Patent
Sato et al.

(10) Patent No.: US 6,760,085 B2
(45) Date of Patent: Jul. 6, 2004

(54) WAVELENGTH SELECTING MODULE AND WAVELENGTH SELECTING APPARATUS

(75) Inventors: Yoshiro Sato, Osaka (JP); Manabu Takami, Fukushima (JP)

(73) Assignees: Nippon Sheet Glass Co., Ltd., Osaka-Osaka (JP); Nanox Corporation, Fukushima-Fukushima-Ken (JP)

(*) Notice: Subject to any disclaimer, the term of this patent is extended or adjusted under 35 U.S.C. 154(b) by 65 days.

(21) Appl. No.: 10/082,823

(22) Filed: Oct. 19, 2001

(65) Prior Publication Data

US 2004/0012735 A1 Jan. 22, 2004

(30) Foreign Application Priority Data

Oct. 19, 2000 (JP) .................................... 2000-319465

(51) Int. Cl.[7] .................................................. G02F 1/13
(52) U.S. Cl. ...................................... 349/115; 349/196
(58) Field of Search .................................. 349/196, 115

(56) References Cited

U.S. PATENT DOCUMENTS

| | | | | |
|---|---|---|---|---|
| 4,991,924 A | * | 2/1991 | Shankar et al. | 349/196 |
| 6,473,143 B2 | * | 10/2002 | Li et al. | 349/88 |
| 6,490,017 B1 | * | 12/2002 | Huang et al. | 349/97 |

* cited by examiner

*Primary Examiner*—James A. Dudek
(74) *Attorney, Agent, or Firm*—Fish & Richardson P.C.

(57) ABSTRACT

A wavelength selecting module includes a first collimator for collimating diverging light to generate a collimated light beam and a liquid crystal cell having a predetermined helical direction. The liquid crystal cell separates a light signal having a specific wavelength among a plurality of light signals of the collimated light beam into a left circularly polarized light and a right circularly polarized light, reflects one of the left and right circularly polarized light signals that has a same optical rotatory direction as the predetermined helical direction toward the first collimator in a first state. The liquid crystal cell passes the plurality of light signals of the collimated light beam in a second state. The liquid crystal cell changes between the first state and the second state in accordance with a change in a voltage applied thereto, thereby switching between selection and non-selection of light having the specific wavelength.

16 Claims, 10 Drawing Sheets

WAVELENGTH SELECTING MODULE AND WAVELENGTH SELECTING APPARATUS

BACKGROUND OF THE INVENTION

The present invention relates to an optical device which is used in optical communications, such as wavelength multiplexing communications, and, more particularly, to a wavelength selecting module that selects a light signal having a specific wavelength from a plurality of light signals having different center wavelengths and a wavelength selecting apparatus that selects one or more types of light signals from plural light signals.

Optical devices, such as an optical fiber and collimator lens, have been used in optical communication equipment. As optical communications become more popular, further miniaturization and larger scale integration of optical communication equipment become necessary. Further, optical communications require a technique of selectively demultiplexing light by wavelength. In this respect, optical filters have been proposed, such as an edge filter or a narrow band filter (see FIG. 11), which is a multilayer filter having an alternate stack of dielectric layers with a high refractive index and dielectric layers with a low refractive index.

Figure 11:
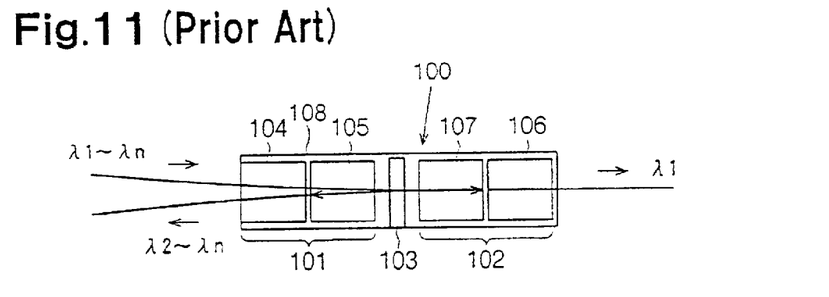
FIG. 11 is a schematic diagram of a filter module according to the prior art.

A filter module 100 according to the related art of FIG. 11 selects a light signal having a specific wavelength from a plurality of light signals having different center wavelengths ($\lambda 1$ to $\lambda n$). The filter module 100 includes a two-core collimator 101, a single-core collimator 102, and a multilayer filter 103 provided between the collimators 101 and 102, The two-core collimator 101 includes a two-core capillary 104 which holds two optical fibers, and a collimator lens 105 comprising a rod lens. The single-core collimator 102 includes a single-core capillary 106 which holds a single optical fiber, and a collimator lens 107. Reference numeral "108" denotes a sleeve. The filter module 100 passes only a light signal having a specific wavelength (e.g., $\lambda 1$) among the light signals having center wavelengths $\lambda 1$ to $\lambda n$ and reflects the remaining light signals having center wavelengths $\lambda 2$ to $\lambda n$.

The specific wavelength ($\lambda 1$) is determined in accordance with the wavelength selecting characteristic of the multilayer filter 103 and the filter module 100 always selects a light signal which has the determined specific wavelength. In case of using the filter module 100, therefore, it is not possible to arbitrarily switch between selection of a light signal having a specific wavelength and non-selection of the light signal.

Figure 12:
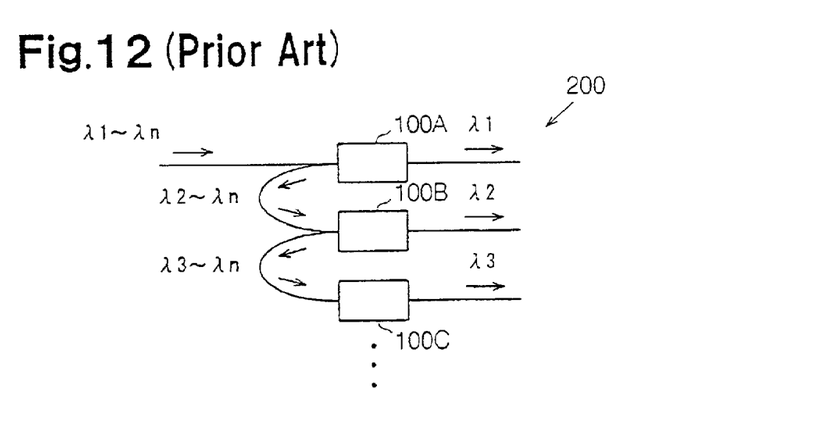
FIG. 12 is a schematic diagram of a wavelength selecting apparatus according to the prior art.

FIG. 12 is a schematic diagram of a wavelength selecting apparatus 200 which has a plurality of filter modules 100A, 100B, 100C and so forth cascade-connected. In the wavelength selecting apparatus 200, the filter module 100A selects a light signal having a center wavelength $\lambda 1$ and reflects the other light signals ($\lambda 2$ to $\lambda n$). The filter module 100B selects a light signal having a center wavelength $\lambda 2$ and reflects the other light signals ($\lambda 3$ to $\lambda n$). The filter module 100C selects a light signal having a center wavelength $\lambda 3$ and reflects the other light signals ($\lambda 4$ to $\lambda n$). Likewise, the light signals that have the center wavelengths $\lambda 4$, $\lambda 5$, . . . and $\lambda n$ are selected one after another.

The wavelength selecting apparatus 200 has the following disadvantages.

(a) Since light signals that have the center wavelengths $\lambda 1$, $\lambda 2$, $\lambda 3$, . . . are always selected by plural (n) filter modules 100A, 100B, 100C, . . . , respectively, it is not possible to arbitrary select more than one type of light signal from light signals of $\lambda 1$ to $\lambda n$.

(b) Those light signals which have wavelengths not selected by each filter module are reflected and enter the next filter module. Therefore, a light signal loss occurs every time each filter module reflects light signals and such losses are accumulated in accordance with the number of filter modules. Specifically, as the intensities of the light signals of $\lambda 2$ to $\lambda n$ fall through reflection by the filter module 100A, the intensity of the light signal of $\lambda 2$ that is selected by the filter module 100B is lower than the intensity of the first light signal. Since the intensities of the light signals of $\lambda 3$ to $\lambda n$ become lower through reflection by the filter module 100B, the intensity of the light signal of $\lambda 3$ that is selected by the filter module 100C is lower than the intensity of the light signal of $\lambda 2$. Apparently, the intensity of a light signal becomes lower as the selection order of that light signal becomes later.

As the number of filter modules connected becomes larger, the light signal loss (the attenuation of the light intensity) becomes greater. To prevent an increase in light signal loss, it is necessary to improve the connection of the individual filter modules. In case where the intensity of a light signal becomes lower than demanded, the light signal should be amplified by an amplifier. The attempts to improve the connection of the individual filter modules or the use of an amplifier seriously stands in the way of constructing an optical communication system which deals with a vast amount of information.

SUMMARY OF THE INVENTION

Accordingly, a first object of the present invention is to provide a wavelength selecting module capable of switching between selection and non-selection of light having a specific wavelength.

A second object of the present invention is to provide a wavelength selecting apparatus which arbitrarily selects one or more types of light signals from plural types light signals having different center wavelengths and suppresses attenuation of the intensity of the selected light.

In a first aspect of the present invention, a wavelength selecting module for selecting a light signal having a specific wavelength from a plurality of light signals having different center wavelengths is provided. The plurality of light signals are provided as diverging light. The module includes a first collimator for collimating the diverging light to generate a collimated light beam and a liquid crystal cell having a predetermined helical direction. The liquid crystal cell separates a light signal having a specific wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, and passes the plurality of light signals of the collimated light beam in a second state. The liquid crystal cell changes between the first state and the second state in accordance with a change in physical energy applied thereto.

In a second aspect of the present invention, a wavelength selecting apparatus for selecting at least one light signal from a plurality of light signals having different center wavelengths is provided. The plurality of light signals are provided as diverging light. The apparatus includes a plurality of wavelength selecting modules and a plurality of optical fibers for optically connecting the plurality of wavelength selecting modules. Each wavelength selecting module includes a first collimator for collimating the diverging light to a generate a collimated light beam and a liquid crystal cell having a predetermined helical direction and receiving the plurality of light signals of collimated light beam from the first collimator. The liquid crystal cell separates a light signal having an associated wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, passes the plurality of light signals of the collimated light beam in a second state. The liquid crystal cell changes between the first state and the second state in accordance with a change in physical energy applied thereto.

In a third aspect of the present invention, a wavelength selecting apparatus for selecting at least one light signal from a plurality of light signals having different center wavelengths is provided. The plurality of light signals are provided as diverging light. The apparatus includes a first collimator for collimating the diverging light to generate a collimated light beam and a liquid crystal cell unit for receiving the plurality of light signals of the collimated light beam from the first collimator and reflecting at least one light signal toward the first collimator. The liquid crystal cell unit includes a plurality of stacked liquid crystal cells. Each liquid crystal cell includes a liquid crystal which has a pair of surfaces and a predetermined helical direction. The liquid fix crystal separates a light signal having an associated wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, passes the plurality of light signals of the collimated light beam in a second state. The liquid crystal changes between the first state and the second state in accordance with a change of a voltage applied thereto. Each liquid crystal cell further includes a pair of transparent electrodes which is provided on the pair of surfaces of the liquid crystal and to which the voltage is applied. At least one liquid crystal enters the first state by individually changing voltages applied to the liquid crystals via the pairs of transparent electrodes.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.
(First Embodiment)

Figure 1:
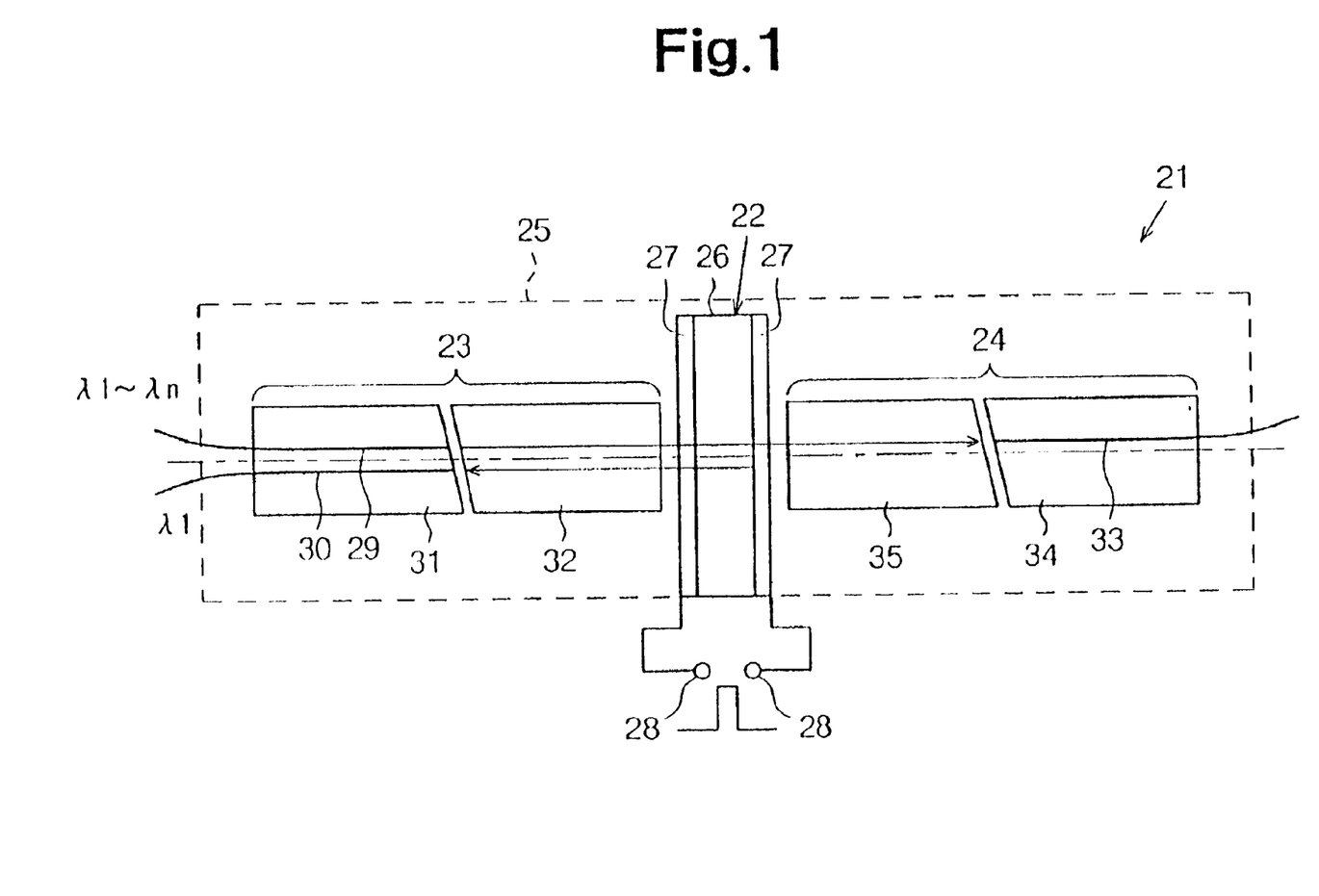
FIG. 1 is a schematic diagram of a wavelength selecting module according to a first embodiment of the present invention.

A wavelength selecting module 21 according to a first embodiment of the present invention will now be described with reference to FIG. 1. The wavelength selecting modulo 21 selects a light signal Slaving a specific wavelength (e.g., λ1) among a plurality of light signals (mixed light signals) having center wavelengths (λ1 to λn). The wavelength selecting module 21 has a liquid crystal cell (LC cell) 22, a collimator having two optical fibers (hereinafter referred as a two-core collimator) 23 arranged to face a first side (light-incident side) of the LC cell 22, a collimator having one optical fiber (hereinafter referred as a single-core collimator) 24 arranged to face a second side (light-emerging side) of the LC cell 22, and a sleeve 25 for holding the LC cell 22 and the collimators 23 and 24. The sleeve may be replaced with a holding member, such as a casing.

The LC cell 22 has a cholesteric liquid crystal 26 and a pair of transparent electrodes 27 respectively provided on both surfaces of the cholesteric liquid crystal 26. The transparent electrodes 27 are respectively connected to a pair of terminals 28. The terminals 28 are supplied with a voltage pulse signal whose ON/OFF state is controlled to enable or disable the voltage that is applied between the pair of transparent electrodes 27.

The cholesteric liquid crystal 26 has the "circular dichroism" to separate a light signal having a specific wavelength (λ1) among plural light signals as a collimated light beam emitted from the two-core collimator 23 into two circularly polarized light signals of right; and left optical rotatory powers, and the "selective reflection effect" to selectively reflect that circularly polarized light signal of the light signal having the specific, wavelength which has the same optical rotatory direction as the helical direction of LC cell 22.

That is, the cholesteric liquid crystal 26 separates a light signal having a specific wavelength into right and left circularly polarized light signals in accordance with the voltage applied to the pair of transparent electrodes 27, and changes between a first state (planar texture) of selectively reflecting that circularly polarized light signal which has the same optical rotatory direction as the helical direction and a second state (homeotropic texture) of passing a light signal.

It is assumed that the optical rotatory direction of circularly polarized light is defined with respect to incident light and that the cholesteric liquid crystal 26 is a right optical rotatory crystal which has a right; helical direction. In this case, the left circularly polarized light that has the opposite optical rotatory direction to the helical direction is passed and the right circularly polarized light that has the same optical rotatory direction as the helical direction is selectively scattered and reflected.

Figure 10:
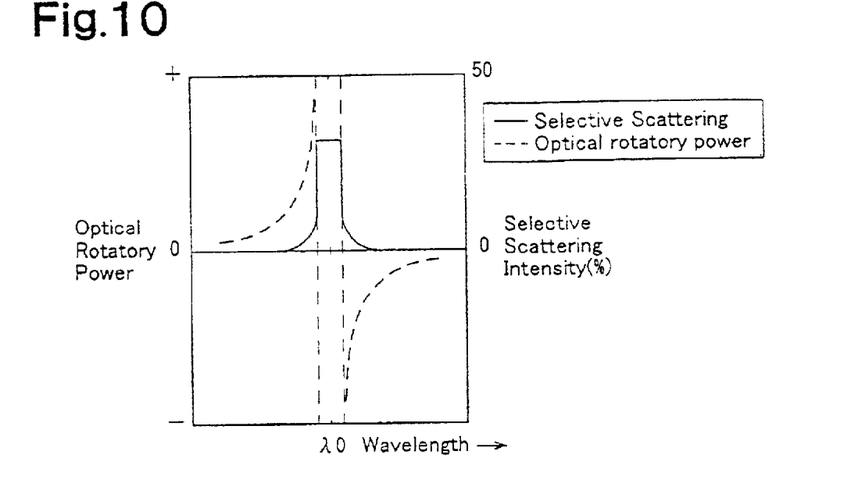
FIG. 10 is a graph showing the optical property of a cholesteric liquid crystal.

The maximum scattered reflection (selective light scattering) occurs at a wavelength $\lambda 0$ (the maximum selective light scattering wavelength $\lambda 0$ shown in FIG. 10) according to the following equation (1).

$$\lambda 0 = n \cdot p \quad (1)$$

where p is the helical pitch of the cholesteric liquid crystal 26 and n is an average refractive index in a plane perpendicular to the helical axis of the liquid crystal 26. The average refractive index n is given by the following equation (2).

$$n = \sqrt{\{(n\|)^2 + (n\perp)^2\}^{1/2}}/2 \quad (2)$$

The wavelength bandwidth $\Delta\lambda$ of the scattered reflected light is given by the following equation (3).

$$\Delta\lambda \sim \Delta n \cdot p \quad (3)$$

where $\Delta n = n\| - n\perp$.

According to the first embodiment, the average refractive index n and the helical pitch p are set such that the maximum selective light scattering wavelength $\lambda 0$ becomes, for example, the specific wavelength $\lambda 1$.

When a voltage is applied between the pair of transparent electrodes 27, for example, the cholesteric liquid crystal 26 passes all of the light signals. When the voltage application stops, the cholesteric liquid crystal 26 reflects (causes the scattered reflection of) the right circularly polarized light of the light signal having the specific wavelength ($\lambda 1$), which has the same optical rotatory direction as the helical direction.

The two-core collimator 23 includes a two-core capillary 31 which holds two optical fibers 29 and 30, and a collimator lens 32, such as a rod lens. The diverging light that emitted from the optical fiber 29 is collimated by the collimator lens 32 and a collimated light beam in turn perpendicularly enters the LC cell 22. The light signal that is reflected by the LC cell 22 passes through the collimator lens 32, enters the optical fiber 30 and emerges from the optical fiber 30 as a optically selected light signal.

The single-core collimator 24 includes a single-core capillary 34 which holds one optical fiber 33, and a collimator lens 35, such as a rod lens. The light beam that passes through the LC cell 22 is converged by the collimator lens 35 and a converged light beam in turn enters the optical fiber 33.

The wavelength selecting module 21 of the first embodiment has the following advantages.

(1) When a voltage is applied to the pair of transparent electrodes 27, the cholesteric liquid crystal 26 is in the second state. Suppose that, in the second state, a collimated light beam collimated from light signals having plural wavelengths ($\lambda 1$ to $\lambda n$) by the collimator lens 32 enter the LC cell 22 perpendicularly. The light beam pass through the LC cell 22 and is converged by the collimator lens 35. The converged light beam enters the optical fiber 33 and emerges therefrom. That is, none of the wavelengths of the light signals are selected in this case.

When application of the voltage to the pair of transparent electrodes 27 stops, the cholesteric liquid crystal 26 enters the first state. When light signals perpendicularly enters the LC cell 22 in the first state, the cholesteric liquid crystal 26 separates the light signal having the specific wavelength ($\lambda 1$) among the incident light beam into right and left circularly polarized light signals and selectively reflects the right circularly polarized light (having the wavelength $\lambda 1$) that has the same optical rotatory direction as the helical direction. The reflected light signal having the specific wavelength ($\lambda 1$) is converged by the collimator lens 32 and a converged light beam enters the optical fiber 30 and emerges therefrom. That is, the reflected light is converged and is coupled to the optical fiber 30.

The light signal that has a specific wavelength (for example, $\lambda 1$) is acquired by disabling the pulse signal to be applied to the pair of terminals 28, 28 and setting the voltage applied between the pair of transparent electrodes 27 to Zero (0). Therefore, the wavelength selecting module 21 can arbitrarily switch between selection and non-selection of a light signal having a specific wavelength, and can be used in a variety of applications as an optical communication optical device.

(2) By adequately setting the average refractive index n and the helical pitch p, the wavelength selecting module 21 which changes the wavelength of light to be reflected by the cholesteric liquid crystal 26 can be designed easily.

(3) The two-core collimator 23 is located facing the light-incident side of the LC cell 22. Therefore, the light signal having a specific wavelength which is reflected by the cholesteric liquid crystal 26 is converted by the collimator lens 32 to a collimate light beam which is acquired from the optical fiber 30. This can ensure easy and high-efficient optical coupling to optical fibers, which facilitates the construction of an optical communication system, (4) The single-core collimator 24 is located facing the light-emerging side of the LC cell 22. Therefore, the light beam that has passed the cholesteric liquid crystal 26 is converged and a converged light beam enters to the optical fiber 33. That is, light beam is converged and coupled to the optical fiber 33. Therefore, light signals can easily be transmitted to an optical communication optical device of another wavelength selecting module or the like. This ensures easy and high-efficient optical coupling to optical fibers, which facilitates the construction of an optical communication system.

(Second Embodiment)

A wavelength selecting module 21A according to a second embodiment of the present invention will now be described with reference to FIG. 2. The wavelength selecting module 21A has a pair of wave plates 40 and 41 respectively provided on the surfaces of the pair of transparent electrodes 27 of the LC cell 22. The wave plate 40 is located between the collimator lens 32 and the transparent electrode 27 that is located on the light-incident side of the LC cell 22. The wave plate 41 is located between the transparent electrode 27 that is located on the light-emerging side of the LC cell 22 and the collimator lens 35.

The wave plate 40 converts collimated light beam from the collimator lens 32 to a circularly polarized light signal that has the same optical rotatory direction as the helical direction of the cholesteric liquid crystal 26. Because the cholesteric liquid crystal 26 is a right optical rotatory crystal which has a right helical direction, the wave plate 40 converts the collimated light beam to right circularly polarized light in the second embodiment. The wave plate 41 returns the right circularly polarized light signal that passes through the cholesteric liquid crystal 26 to a non-polarized light signal.

The wavelength selecting module 21A of the second embodiment has the following advantages.

(1) In the first embodiment, the right circularly polarized light signal of the right and left circularly polarized light signals separated from the light signal having a specific wavelength (λ1) is reflected by the LC cell 22. Therefore, the reflection efficiency of the selected light signal is about 50%.

In the second embodiment, by way of contrast, the collimated light beam converted to the right circularly polarized light by the wave plate 40 enters the LC cell 22. When the applied voltage is set to 0, therefore, the light signal having a specific wavelength (λ1) converted to the right circularly polarized light is reflected by the LC cell 22. Therefore, the reflection efficiency of the selected light signal is approximately 100%.

(2) The light signal (right circularly polarized light) with a specific wavelength (λ1) that is reflected by the cholesteric liquid crystal 26 is converted back to a non-polarized light signal by the wave plate 40 and is emitted from the optical fiber 30. Therefore, another optical communication optical device which receives the light emerging from the optical fiber 30 does not need to convert the circularly polarized light to a non-polarized light using a wave plate or the like. This ensures easy and high-efficient optical coupling to optical fibers, thereby facilitating the construction of an optical communication system.

(Third Embodiment)

Figure 3:
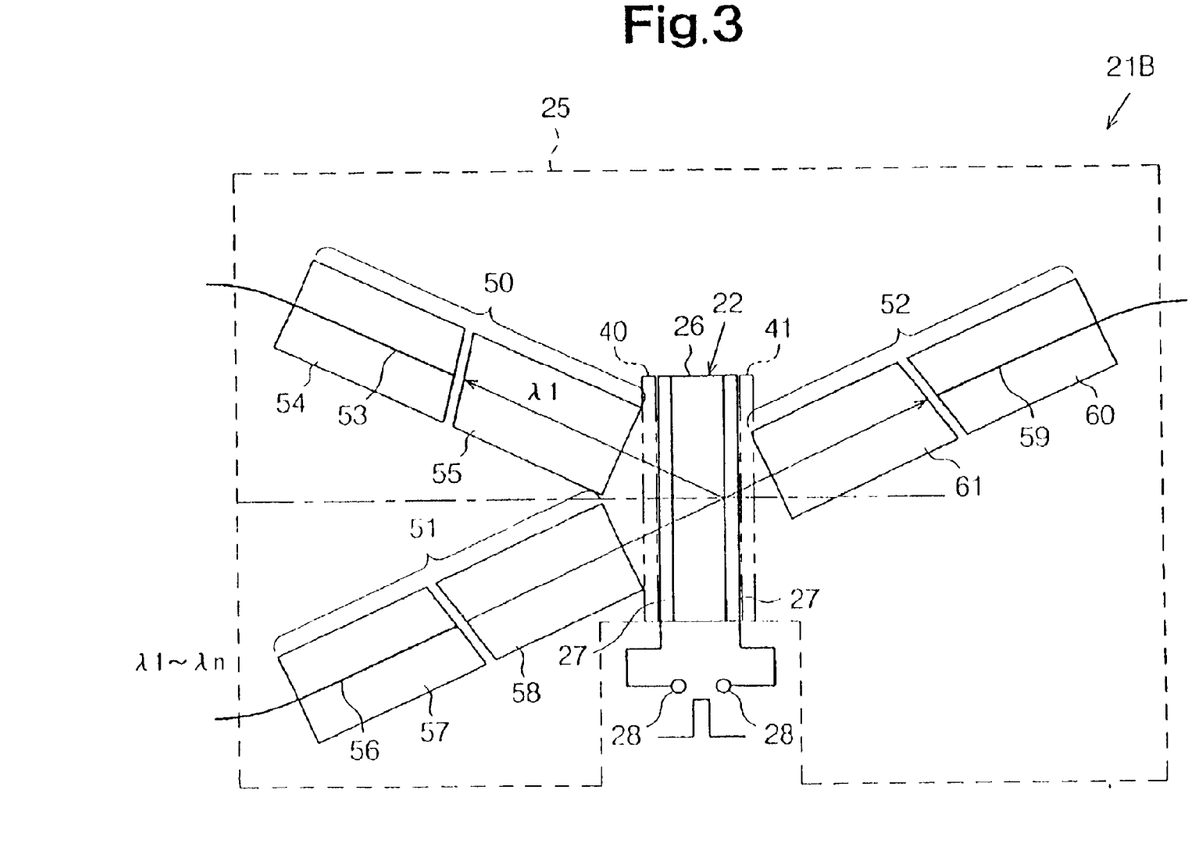
FIG. 3 is a schematic diagram of a wavelength selecting module according to a third embodiment of the present invention.

A wavelength selecting module 21B according to a third embodiment of the present invention will now be described with reference to FIG. 3. The wavelength selecting module 21B has a single-core collimator 51 arranged obliquely below with respect to the light-incident side of the LC cell 22, a single-core collimator 50 arranged obliquely above with respect to the light-incident side of the LC cell 22, and a single-core collimator 52 arranged obliquely above with respect to the light-emerging side of the LC cell 22. The single-core collimator 51 collimate a light beam to generate a collimated light beam and causes the collimated light beam to enter the LC cell 22 askew. The single-core collimator 50 converges a optically selected signal with a specific wavelength reflected by the LC cell 22 and emits the optically selected light signal. The single-core collimator 52 converges a light beam which passes the cholesteric liquid crystal 26 askew and emits the light beam.

The single-core collimator 50 includes a single-core capillary 54 for holding a single optical fiber 53, and a collimator lens 55. The single-core collimator 51 includes a single-core capillary 57 for holding a single optical fiber 56, and a collimator lens 58. The single-core collimator 52 includes a single-core capillary 60 for holding a single optical fiber 59, and a collimator lens 61.

The wavelength selecting module 21B of the third embodiment has the following advantages.

Two single-core collimators 50 and 51 are arranged on the light-incident side of the LC cell 22. The adjustment (alignment) of the optical fiber 53 and the collimator lens 55 and the adjustment (alignment) of the optical fiber 56 and the collimator lens 58 are easier than the adjustment of the optical fibers and the collimator lenses of the two single-core collimators 50 and 51. This facilitates the manufacture of the wavelength selecting module 21B.

(Fourth Embodiment)

A wavelength selecting apparatus 300 according to a fourth embodiment of the present invention will now be described with reference to FIGS. 4 and 5.

Figure 2:
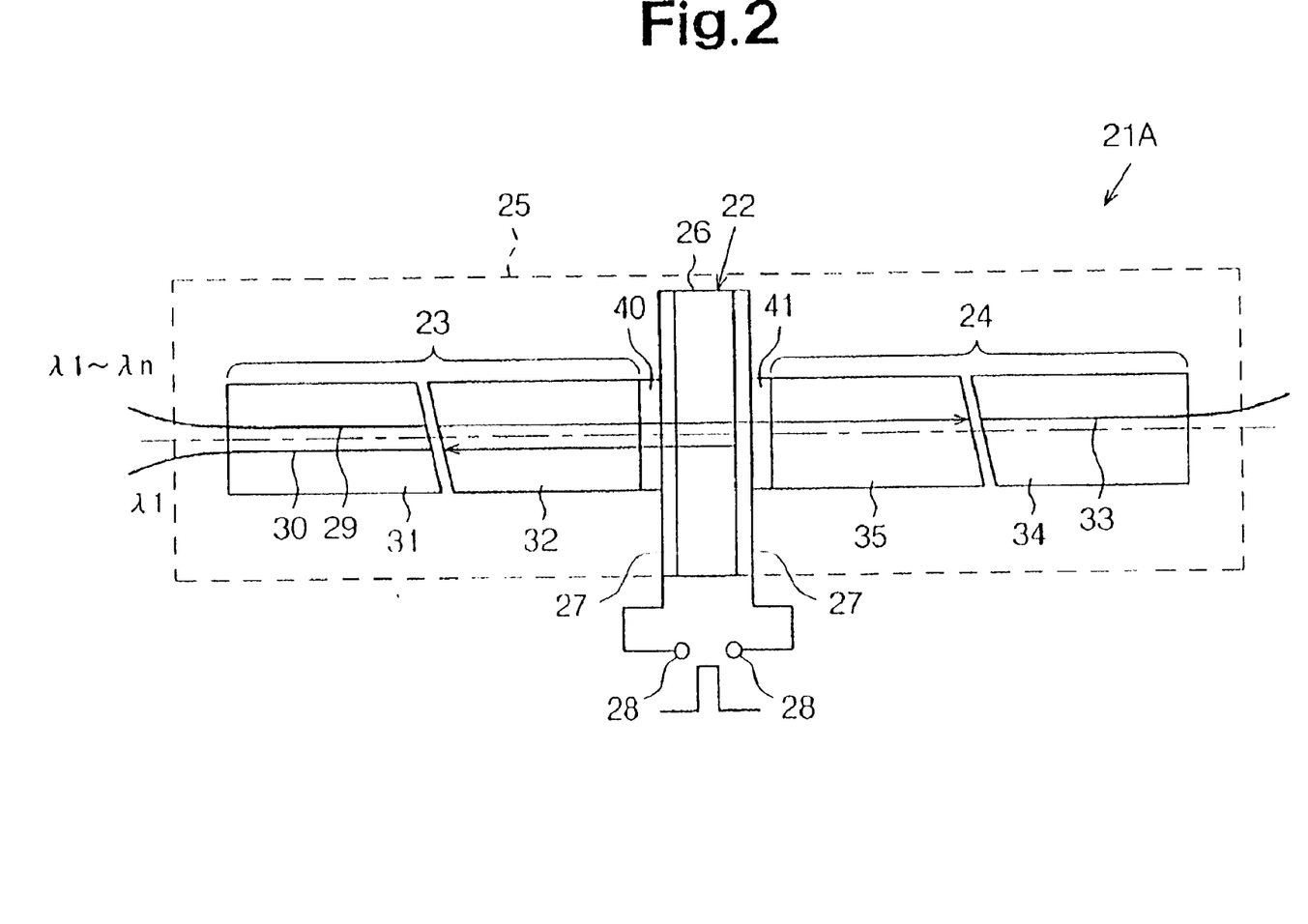
FIG. 2 is a schematic diagram of a wavelength selecting module according to a second embodiment of the present invention.

The wavelength selecting apparatus 300 has plural (four in this embodiment) wavelength selecting modules M1 to M4 each having the same structure as that of the wavelength selecting module 21A of FIG. 2. The wavelength selecting apparatus 300 selects one or more types of light signal from plural light signals which have different center wavelengths (λ1 to λ4).

The four wavelength selecting modules M1 to M4 are cascade-connected via three optical fibers 65, 66 and 67. The four wavelength selecting modules M1 to M4 respectively select light signals which have different wavelengths.

That is, the four wavelength selecting modules M1 to M4 are designed such that by adequately setting the average refractive indexes n and the helical pitches p of the cholesteric liquid crystals 26 of the four LC cells 22 (LC1 to LC4), light signals which have different wavelengths are respectively reflected by the four cholesteric liquid crystals 26. In the fourth embodiment, light signals of wavelengths λ1, λ2, λ3 and λ4 are respectively reflected and selected by the cholesteric liquid crystals 26 of the wavelength selecting modules M1, M2, M3 and Me.

Figure 5:
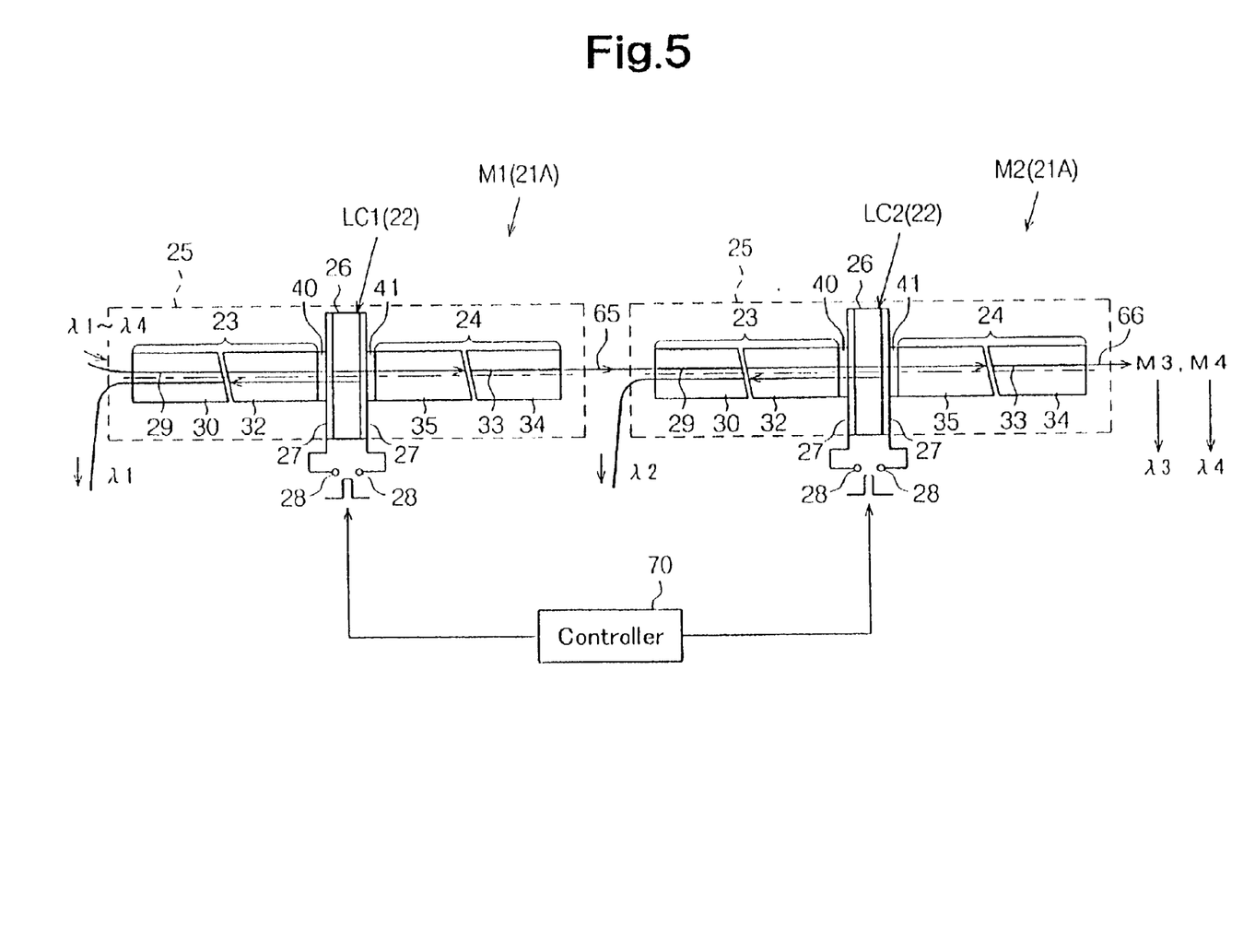
FIG. 5 is a schematic diagram showing a part of the wavelength selecting apparatus of FIG. 4.

As shown in FIG. 5, the wavelength selecting apparatus 300 has a controller 70 connected to the four wavelength selecting modules M1, M2, M3 and M4. The controller 70 controls the enableness and disableness of the pulse signal that is supplied to a pair of terminals 28 of each module. The four wavelength selecting modules M1, M2, M3 and M4 are retained in a single case 68 to provide the single moduled wavelength selecting apparatus 300.

The wavelength selecting apparatus 300 of the fourth embodiment has the following advantages.

(1) In case of selecting only one type of light signal (e.g., a light signal of the wavelength λ1), the controller 70 disables the pulse signal that is supplied to the pair of terminals 28 of the wavelength selecting module M1 to thereby set the voltage that is applied to the pair of transparent electrodes 27 of the module M1 to 0 V. The pulse signals are supplied to the pairs of terminals 28 of the other wavelength selecting modules M2 to M4. In this case, the cholesteric liquid crystal 26 of the wavelength selecting module M1 alone is in the first state. Therefore, the cholesteric liquid crystal 26 of the wavelength selecting module M1 reflects the light signal of the wavelength λ1 among the light signals (λ1 to λ4) which have been converted to right circularly polarized lights by the wave plate 40. The reflected light signal is converted back to a non-polarized light signal by the wave plate 40. The non-polarized light signal is converted by the collimator 23 to a collimated light beam, which in turn emerges from the optical fiber 30.

In case of simultaneously selecting two or more types of light signals having different wavelengths (egg, light signals of the wavelengths λ1 and λ2), the controller 70 disables the pulse signals that are supplied to the wavelength selecting modules M1 and M2 and allows pulse signals to be supplied to the other wavelength selecting modules M3 and M4. In this case, the cholesteric liquid crystals 26 of the wavelength selecting modules M1 and M2 are in the first state. Therefore, the cholesteric liquid crystals 26 of the wavelength selecting modules M1 and M2 respectively reflect the light signals of the wavelengths λ1 and λ2. The reflected light signals are converted back to non-polarized light signals by the respective wave plates 40. As a result, collimated light beams of the wavelengths λ1 and λ2 are emitted from the modules M1 and M2, respectively.

In case of selecting only the light signal of the wavelength λ3, the controller 70 disables the pulse signal that is supplied to the wavelength selecting module M3. In this case, the cholesteric liquid crystal 26 of the wavelength selecting module M3 alone is in the first state. Therefore, the cholesteric liquid crystal 26 of the wavelength selecting module M3 reflects the light signal of the wavelength λ3 and a collimated light beam is emitted from the module M3.

In short, by controlling the pulse signal supplied to each wavelength selecting module (the voltage to be applied to the transparent electrodes), one or more types of light signal can be arbitrarily selected from a plurality of light signals which have different center wavelengths (λ1 to λ4).

(2) According to the prior art shown in FIG. 12, as the number of filter modules connected increases, the loss of a light signal increases (the light intensity attenuates).

According to the fourth embodiment, by way of contrast, while there is a slight reflection loss at the cholesteric liquid crystal 26 with respect to the light signal with the wavelength that is selected by any one of the wavelength selecting modules M1 to M4, there is no loss with respect to the light signals with unselected wavelengths. That is, the light signal passes the cholesteric liquid crystals 26 of the wavelength selecting modules that do not correspond to the selected wavelength, without a loss, until it reaches the cholesteric liquid crystal 26 of the wavelength selecting module that corresponds to the selected wavelength. While the light signal reaches the corresponding module, therefore, the intensity of that light signal does not attenuate.

In case where the light signal of the wavelength λ1 is selected by the wavelength selecting module M1, for example, the light signals of the wavelengths λ2 to λ4 pass the cholesteric liquid crystal 26 of the module M1 without a loss and reach the respective modules M2 to M4. This suppresses the attenuation of the light signal intensity. It is therefore possible to connect a plurality of wavelength selecting modules to increase the types of selectable wavelengths. This is particularly useful for large-scale optical communication systems which handle a vast amount of information.

(3) Each of the wavelength selecting modules M1 to M4 has the wave plates 40 and 41. Therefore, the reflection efficiency of the light signal selected by each of the modules M1 to M4 is approximately 100%. This further suppresses the loss of a light signal, which is more useful for large-scale optical communication systems.

(Fifth Embodiment)

A wavelength selecting apparatus 400 according to a fifth embodiment of the present invention will now be described with reference to FIGS. 6 and 7. The wavelength selecting apparatus 400 has plural (four) wavelength selecting modules M1 to M4 each having the same structure as that of the wavelength selecting module 21 of FIG. 1. The wavelength selecting apparatus 400 selects one type of light signal or more from plural light signals which have different center wavelengths (λ1 to λ4). According to the fifth embodiment, because each of the wavelength selecting modules M1 to M4 does not have a wave plate, the number of components decreases, leading to cost reduction of the apparatus.

(Sixth Embodiment)

A wavelength selecting apparatus 500 according to a sixth embodiment of the present invention will now be described with reference to FIGS. 8 and 9. The wavelength selecting apparatus 500 selects one or more types of light signals from plural light signals which have different center wavelengths (λ1 to λ4).

Figure 8:
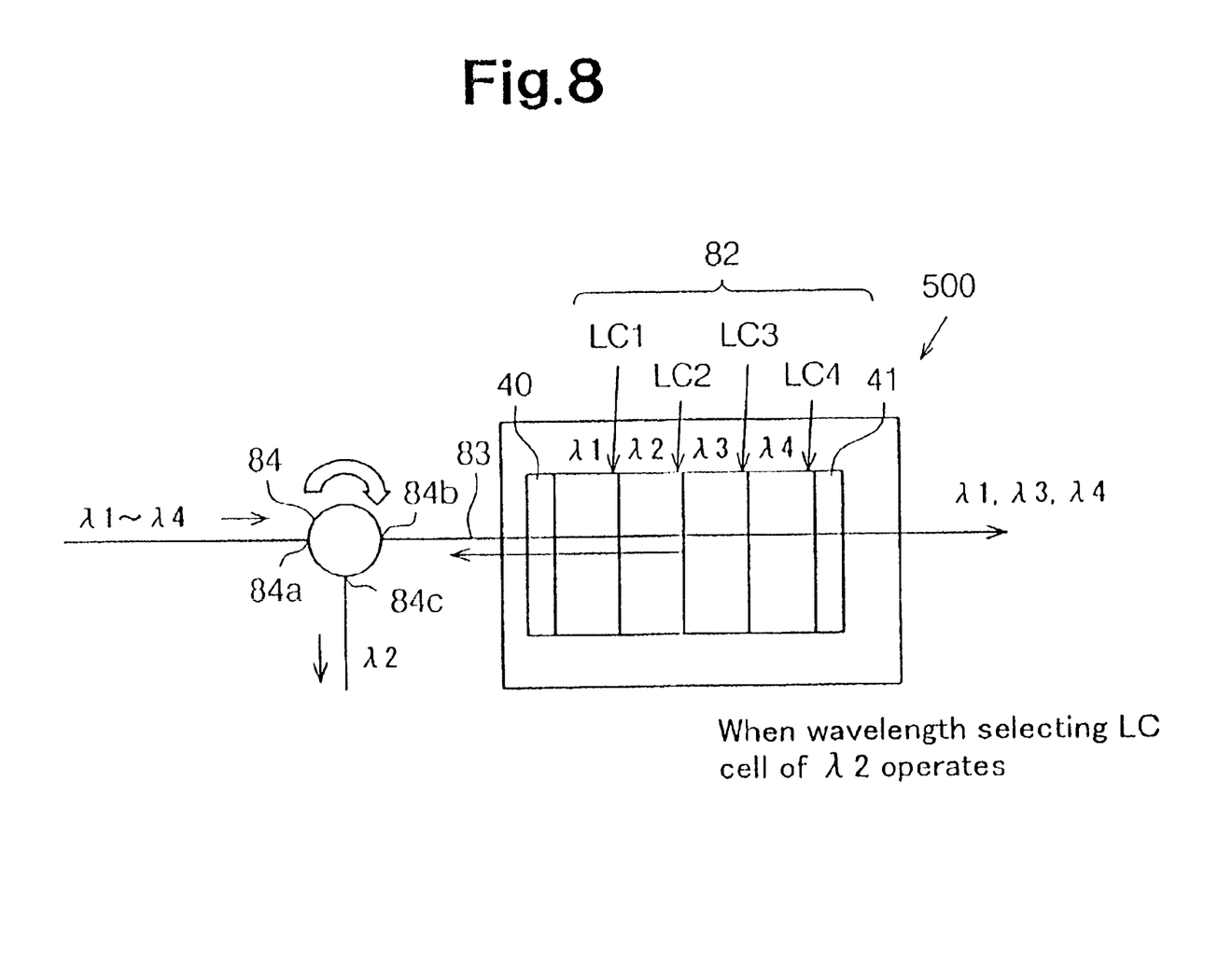
FIG. 8 is a schematic diagram of a wavelength selecting apparatus according to a sixth embodiment of the present invention.
Figure 9:
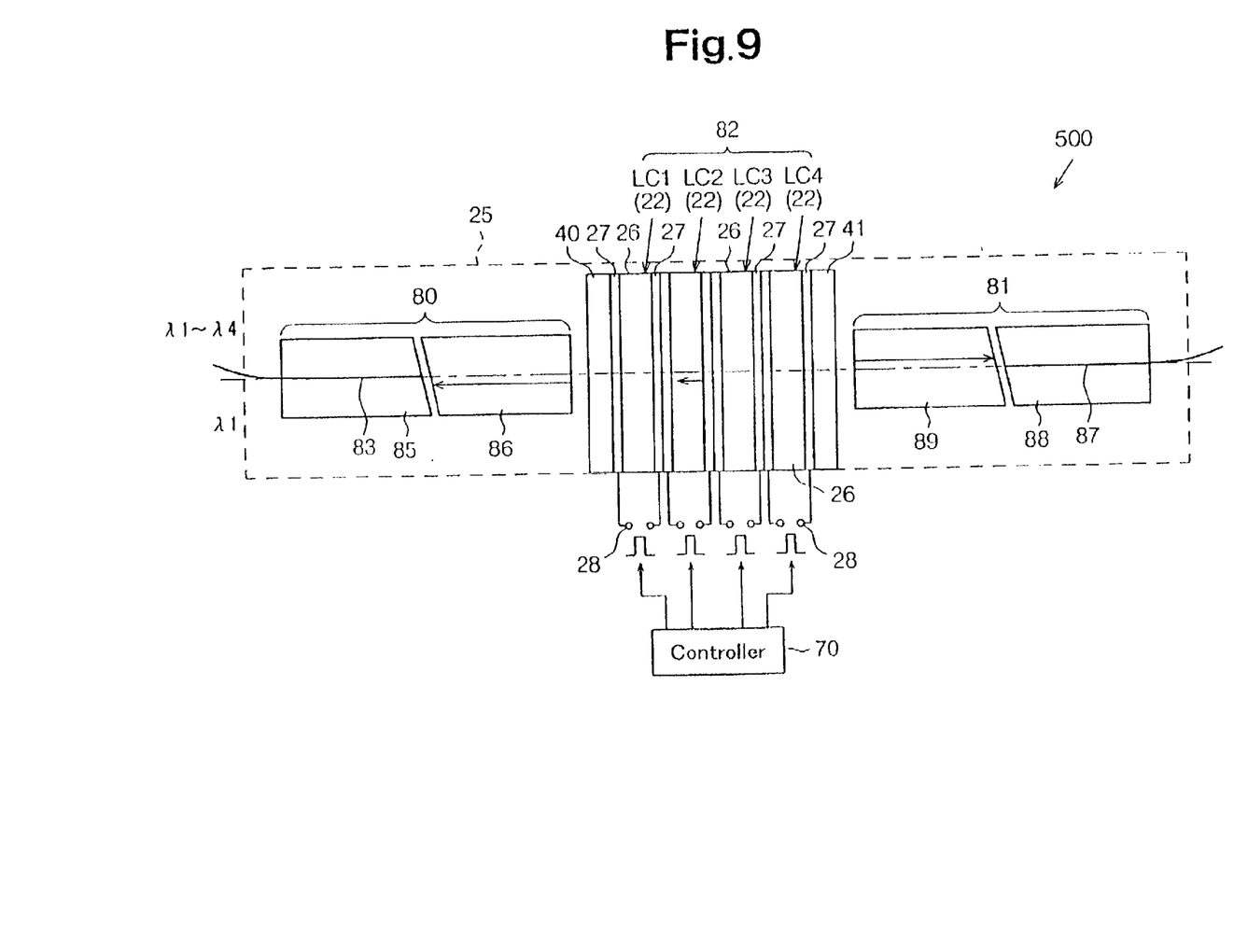
FIG. 9 is a schematic diagram showing a part of the wavelength selecting apparatus of FIG. 8.

As shown in FIG. 9, the wavelength selecting apparatus 500 has a single-core collimator 80 on the light-incident side, a single-core collimator 81 on the light-emerging side and an LC cell unit 82 located between the collimators 80 and 81. The LC cell unit 82 selectively reflects one or more types of light signal from collimated light beam emerging from the single-core collimator 80. The wave plates 40 and 41 are respectively provided on the light-incident side and light-emerging side of the LC cell unit 82. The wavelength selecting apparatus 500 further has the sleeve 25, which holds the collimator lenses 80 and 81, the LC cell unit 82 and the wave plates 40 and 41. As shown in FIG. 8, the wavelength selecting apparatus 500 is connected to an optical circulator 84 via a single optical fiber 83.

As shown in FIG. 9, the single-core collimator 80 includes a single-core capillary 85 which holds the single optical fiber 83 connected to the optical circulator 84, and a collimator lens 86, such as a rod lens. The single-core collimator 81 includes a single-core capillary 88 which holds a single optical fiber 87, and a collimator lens 89, such as a rod lens.

The LC cell unit 82 includes plural sets (four sets) of LC cells 22 (LC1 to LC4). Each LC cell 22 includes the cholesteric liquid crystal 26 and the pair of transparent electrodes 27 provided on the respective surfaces of the liquid crystal 26. In the first state, the four sets of LC cells 22 respectively reflect light signals having specific wavelengths different from one another. For example, the LC cells LC1, LC2, LC3 and LC4 respectively reflect light signals of wavelengths λ1, λ2, λ3 and λ4 in the first state. That is, the LC cells LC1, LC2, LC3 and LC4 are designed such that their maximum selective light scattering wavelengths λ0 respectively become the wavelengths λ1, λ2, λ3 and λ4. When voltages applied to the transparent electrodes 27 of the LC cells LC1, LC2, LC3 and LC4 are changed (enabled or disabled), the cholesteric liquid crystal 26 of at least one of the LC cells LC1, LC2, LC3 and LC4 changes between the first state and the second state.

According to the sixth embodiment, with a voltage applied to the transparent electrodes of each of the LC cells LC1, LC2, LC3 and LC4, the cholesteric liquid crystal 26 of that LC cell is in the second state. When application of the voltage stops, the cholesteric liquid crystal 26 goes into the first state. In case where at least one of the wavelengths λ1 to λ4 is selected, therefore, the voltage applied to the transparent electrodes 27 of at least one of the LC cells LC1, LC2, LC3 and LC4 that corresponds to the selected at least one of the wavelengths λ1 to λ4 is set to 0 V.

The optical circulator 84 receives the light signal sent from the light source or another optical communication optical device at a first terminal 84a and emits the light signal from a second terminal 84b to the single-core collimator 80 via the optical fiber 83. Further, the optical circulator 84 receives the collimated light beam emerging from the single-core collimator 80 at the second terminal 84b via the optical fiber 83 and emits the collimated light beam to an unillustrated light-receiving unit or another optical communication optical device from a third terminal 84c.

The wavelength selecting apparatus 500 of the sixth embodiment has the following advantages.

(1) In case of selecting only one type of light signal (e.g., a light signal of the wavelength λ2), the controller 70 disables the pulse signal supplied to the LC cell LC2. Accordingly, the cholesteric liquid crystal 26 of the LC cell LC2 alone goes into the first state, and the cholesteric liquid crystal 26 of the LC cell LC2 reflects the light signal of the wavelength λ2 among the light signals (λ1 to λ4) which have been converted to right circularly polarized lights by the wave plate 40. The reflected light is converted back to a non-polarized light signal by the wave plate 40. The non-polarized light signal is converged by the collimator lens 86 and a light beam is in turn emitted to the optical circulator 84 via the optical fiber 83.

In case of simultaneously selecting two or more types of light signals (e.g., light signals of the wavelengths λ1 and λ2), the controller 70 disables the pulse signals supplied to the LC cells LC1 and LC2 and allows pulse signals to be supplied to the other LC cells LC3 and LC4. Accordingly, the cholesteric liquid crystals 26 of the LC cells LC1 and LC2 go into the first state, and the cholesteric liquid crystals 26 of the LC cells LC1 and LC2 respectively reflect the light signals of the wavelengths λ1 and λ2. Those reflected light are converted back to non-polarized light signals by the respective wave plates 40. The light signals are converged and a light beam are in turn emitted to the optical circulator 84 via the optical fiber 83.

In case of selecting only the light signal of the wavelength ?3, the controller 70 disables the pulse signal supplied to the LC cell LC3. This causes the cholesteric liquid crystal 26 of the LC cell LC3 alone to go into the first state. Therefore, the light signal having the wavelength λ3 is reflected by the cholesteric liquid crystal 26 of the LC cell LC3. The reflected light is converted back to a non-polarized light signal by the wave plate 40, and a light beam is emitted to the optical circulator 84 via the optical fiber 83.

As apparent from the above, by controlling the voltage applied to the transparent electrodes 27 of each of the LC cells LC1 to LC4, one or more types of light signal can be arbitrarily selected from a plurality of light signals which have different center wavelengths (λ1 to λ4).

(2) Because the wave plates 40 and 41 are respectively provided on the light-incident side and the light-emerging side of the LC cell unit 82, the light signal converted to the right circularly polarized light is reflected by the cholesteric liquid crystal 26 of a corresponding one of the LC cells LC1 to LC4. Therefore, the reflection efficiency of the light signal selected by each of the LC cells LC1 to LC4 is approximately 100%. Further, even if the number of LC cells increases, the number of the wave plates 40 and 41 does riot change. Therefore, the loss of the light signal that is selected by each LC cell is restrained and a large-scale optical communication system is constructed with fewer components.

(3) The LC cell unit 82 is provided between the single-core collimators 80 and 81. That is, two collimators have only to be provided on the light-incident side and the light-emerging side of the LC cell unit 82, respectively. Even if the number of LC cells increases, therefore, the number of the collimators need not be increased. This results in a reduction in the number of components and a reduction in manufacturing cost, and makes the wavelength selecting apparatus compact.

(4) The optical circulator 84 is connected to the wavelength selecting apparatus by the single optical fiber 83. Therefore, the single-core collimator 80, not a two-core collimator, has only to be provided on the light-incident side of the LC cell unit 82. This facilitates the alignment of the single-core collimator 80 on the light-incident side with the single-core collimator 81 on the light-emerging side and simplifies the structure of the wavelength selecting apparatus 500.

It should be apparent to those skilled in the art that the present invention may be embodied in many other specific forms without departing from the spirit or scope of the invention. Particularly, it should be understood that the invention may be embodied in the following forms.

(I) According to each embodiment discussed above, while the voltage is applied to the transparent electrodes 27 of the LQ cell 22, the LC cell 22 is in the second state, and when the voltage application stops, the LC cell 22 shifts to the first state and reflect a light signal with a specific wavelength. A modification may be made such that while no voltage is applied to the transparent electrodes 27 of the LC cell 22, the LC cell 22 is in the second state and when a voltage is applied to the transparent electrodes, the LC cell 22 shifts to the first state.

(II) According to each of the embodiments, as the voltage to be applied to the transparent electrodes 27 of the LC cell 22 is changed, the LC cell 22 is changed between the first state and the second state. The LC cell 22 may be changed between the two states by changing the other physical energies than the voltage that are to be applied to the LC cell 22. The physical energies include, for example, heat, a magnetic field and force.

(III) Instead of the cholesteric liquid crystal, a chiral nomatic liquid crystal which has an optical characteristic similar to that of the cholesteric liquid crystal may be used for the LC cell 22.

(IV) Instead of the cholesteric liquid crystal 26 that has right optical rotatory power, a left optical rotatory liquid crystal of which has a leftward helical direction may be used.

Figure 4:
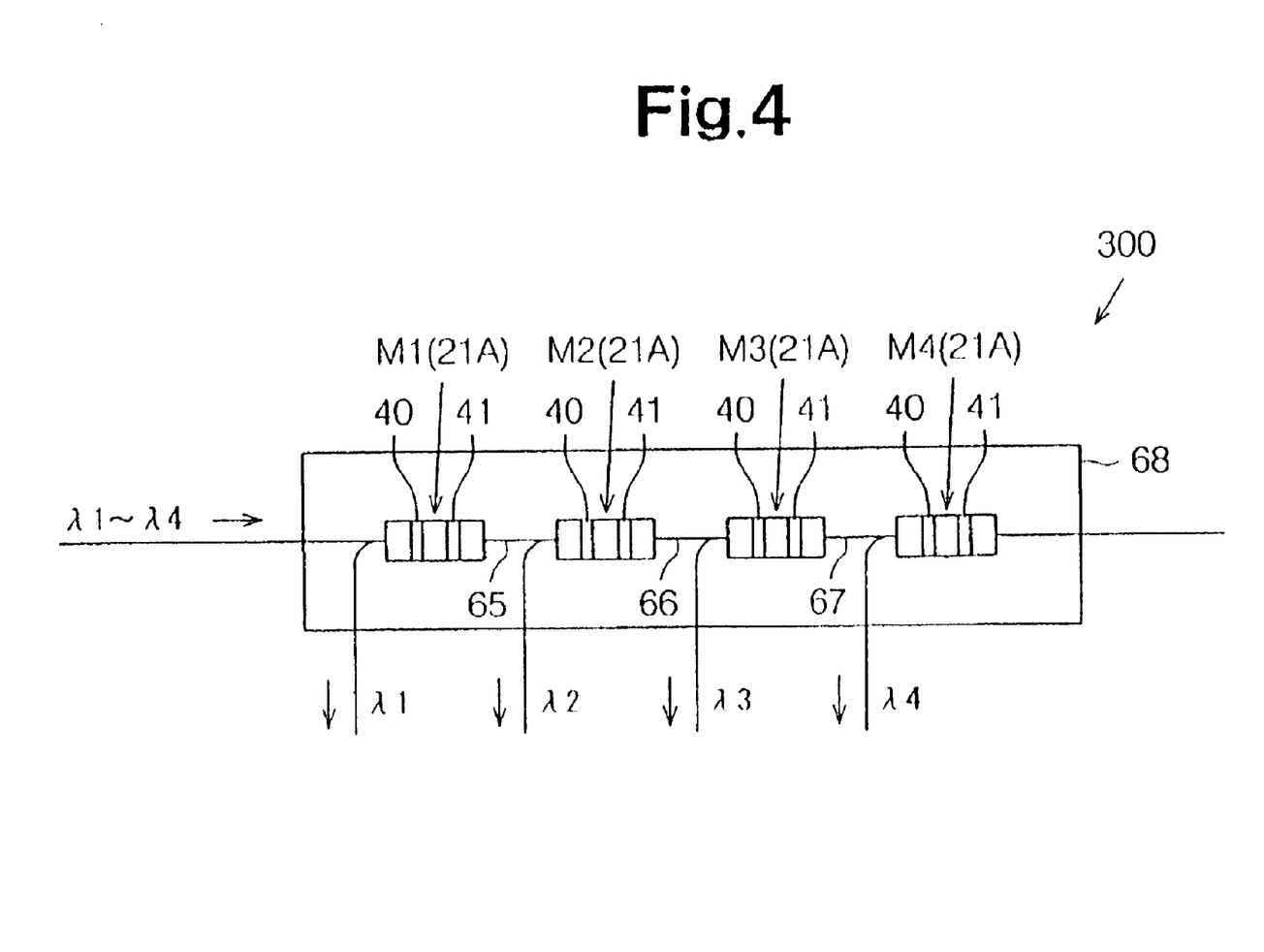
FIG. 4 is a schematic diagram of a wavelength selecting apparatus according to a fourth embodiment of the present invention.
Figure 6:
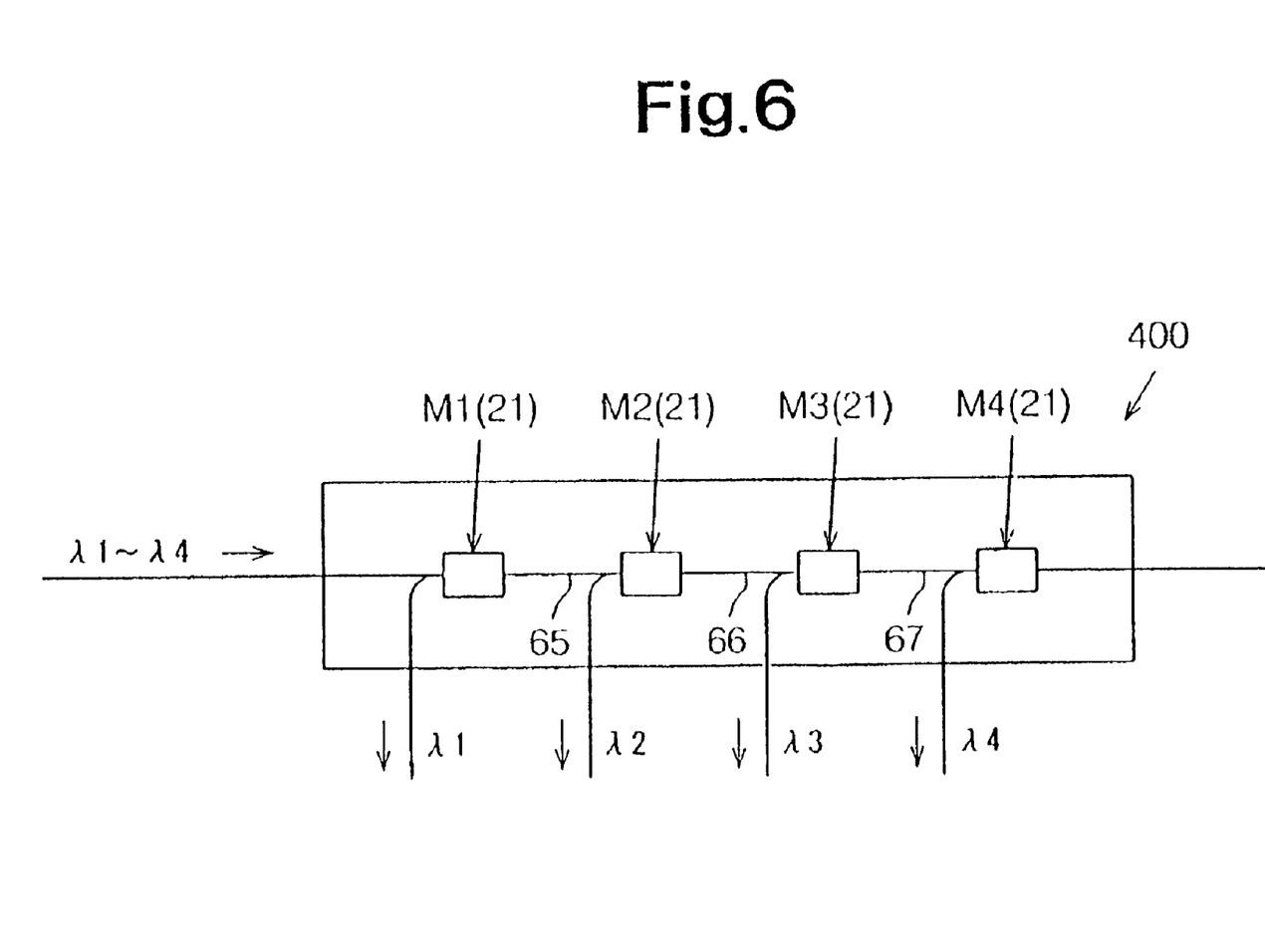
FIG. 6 is a schematic diagram of a wavelength selecting apparatus according to a fifth embodiment of the present invention.
Figure 7:
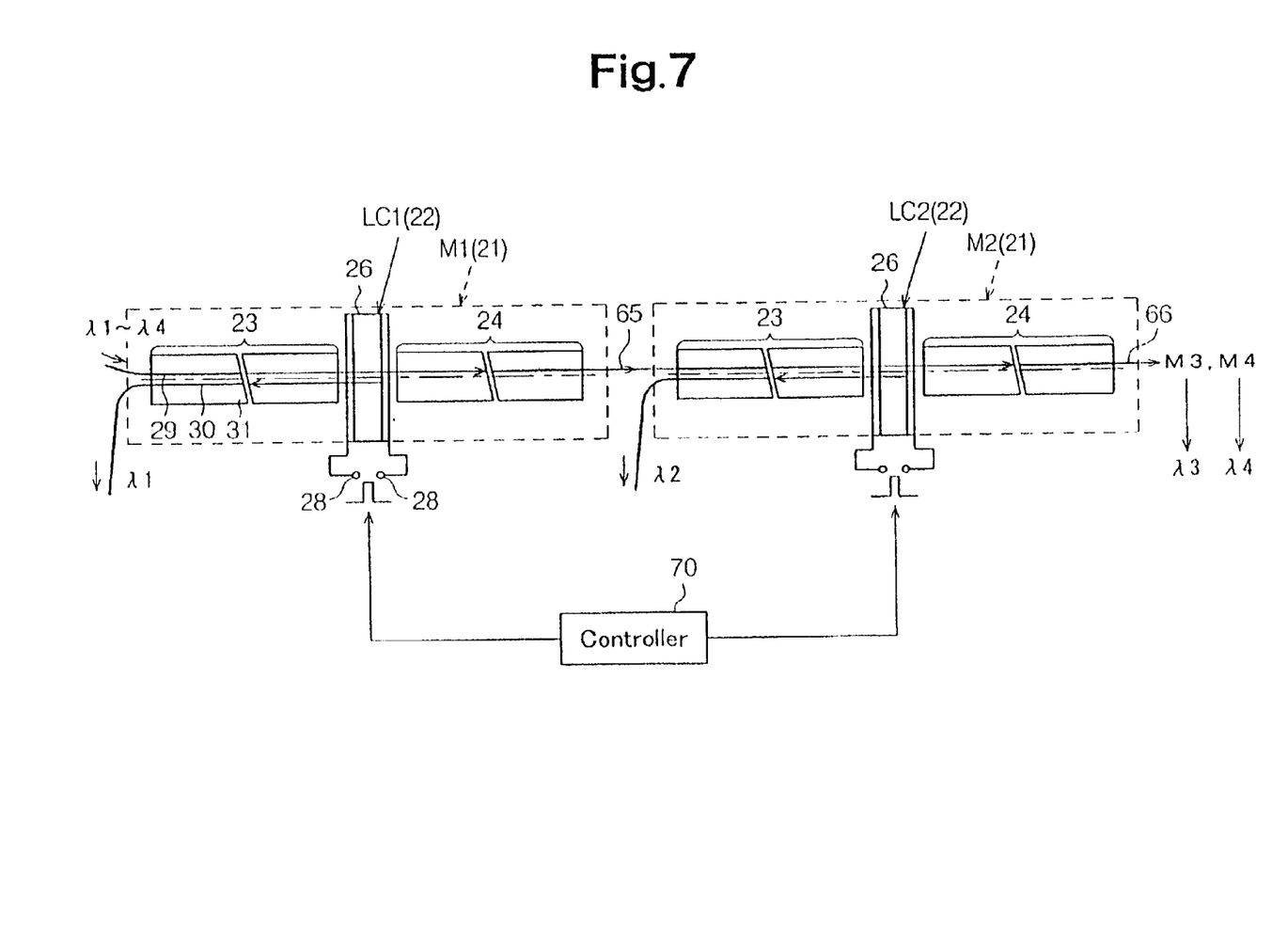
FIG. 7 is a schematic diagram showing a part of the wavelength selecting apparatus of Fig. 6.

(V) The number of wavelength selecting modules in FIGS. 4 and 6 is not limited to four, but may be two or greater.

(VI) The number of the LC cells in the LC cell unit 82 in FIGS. 8 and 9 is not limited to four, but may be two or greater.

Therefore, the present examples and embodiments are to be considered as illustrative and riot restrictive and the invention is not to be limited to the details given herein, but may be modified within the scope and equivalence of the appended claims.

What is claimed is:

1. A wavelength selecting module for selecting a light signal having a specific wavelength from a plurality of light signals having different center wavelengths, the plurality of light signals being provided as diverging light, the module comprising:

a first collimator for collimating the diverging light to generate a collimated light beam;

a liquid crystal cell having a predetermined helical direction, wherein the liquid crystal cell separates a light signal having a specific wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, and passes the plurality flight signals of the collimated light beam in a second state, and wherein the liquid crystal cell changes between the first state and the second state in accordance with a change in physical energy applied thereto; and a first wave plate, located between the liquid crystal cell and the first collimator, for converting the plurality of light signals of the collimated light beam to a plurality of circularly polarized light signals having a same optical rotatory direction as the predetermined helical direction of the liquid crystal.

2. The wavelength selecting module according to claim 1, wherein the liquid crystal cell includes:

a liquid crystal having pair of surfaces; and a pair translucent electrodes which are provided on the pair of surfaces and to which a voltage as the physical energy is applied.

3. The wavelength selecting module according to claim 1, wherein the liquid crystal is one of a cholesteric liquid crystal and a chiral nematic liquid crystal.

4. Th wavelength selecting module according to claim 1, wherein the collimator includes:
   a collimator lens for collimating the diverging light to generate the collimated light beam and converging an optically elected light signal having the specific wavelength reflected by the liquid crystal cell;
   a first optical fiber for guiding the plurality of light signals to emit the diverging light to the collimator lens; and
   a second optical fiber or transmitting the optically selected light signal.

5. Th wavelength selecting module according to claim 1, further comprising a second collimator for receiving a transmission light beam which pass the liquid crystal cell and conversing the transmission light beam.

6. The wavelength selecting module according to claim 5, wherein the second collimator includes:
   a collimator for conversing the transmission light beam; and
   an optical fiber for transmitting the transmission light beam.

7. The wavelength selecting module according to claim 1, wherein the first collimator includes a first collimator unit for causing the collimated light beam to obliquely enter the liquid crystal cell; and
   a second collimator unit for conversing an optically selected light signal having a specific wavelength reflected by the liquid crystal cell.

8. The wavelength selecting module according to claim 5, further comprising a second collimator for conversing a transmission light beam obliquely emitted from the liquid crystal cell.

9. The wavelength selecting module according to claim 1, further comprising second wave plate, arranged opposite to where the first wave plate is provided and facing the liquid crystal cell, for returning the plurality of circularly polarized light signals which have pass the liquid crystal cell to a plurality of non-polarized light signals.

10. A wavelength selecting apparatus for selecting at least one light signal from a plurality of light signals having different center wavelengths, the plurality of light signals being provided diverging light, the apparatus comprising:
    a plurality of wavelength selecting modules positioned in sequence, one wavelength selecting module receiving the plurality of light signals, the remaining wavelength selecting modules each receiving one or more light signals that passed a previous wavelength selecting module; and
    a plurality of optical fibers for optically connecting the plurality of wavelength selecting modules, wherein each wavelength selecting module includes
    a first collimator for collimating the diverging light to generate a collimated light beam, and
    a liquid crystal cell having a predetermined helical direction and receiving the plurality of light signals of the collimated light beam from the first collimator, wherein the liquid crystal cell separated a light signal having an associated wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, passes the plurality of light signals of the collimated light beam in a second stale, and wherein the liquid crystal cell changes between the first state and the second state in accordance with a change in physical energy applied thereto.

11. The wavelength selecting apparatus according to claim 10, wherein at least one liquid crystal cell enters the first state by individually changing voltages as physical energy supplied to the liquid crystal cells of the wavelength selecting modules.

12. Th wavelength selecting apparatus according to claim 10, wherein each wavelength selecting module further includes:
    a first wave plate, located between the liquid crystal cell and the first collimator, for convening the plurality of light signals of the collimated light beam to a plurality of circularly polarized light signals having a same optical rotatory direction as the predetermined helical direction of the liquid crystal; and
    a second wave plate, arranged opposite to where the first wave plate is provided and facing the liquid crystal cell, for returning the plurality of circularly polarized light signals which have passed the liquid crystal cell to a plurality of non-polarized light signals.

13. A wavelength selecting apparatus for selecting at least one light signal from a plurality of light signals having different center wavelengths, the plurality of light signals being provided as diverging light, the apparatus comprising:
    a first collimator for collimating the diverging light to generate a collimated light beam; and
    a liquid crystal cell urn for receiving the plurality of light signals of the collimated light beam from the first collimator and reflecting at least one light signal toward the first collimator,
    wherein the liquid crystal cell unit includes a plurality of stacked liquid crystal cells and
    wherein each liquid crystal cell includes
    a liquid crystal which has a pair of surfaces and a predetermined helical direction, wherein the liquid crystal separates a light signal having an associated wavelength among the plurality of light signals of the collimated light beam into a left circularly polarized light and a right circularly polarized light, reflects one of the left and right circularly polarized light signals that has a same optical rotatory direction as the predetermined helical direction toward the first collimator in a first state, passes the plurality of light signals of the collimated light beam in a second state, an wherein the liquid crystal changes between the first state and the second state in accordance with a change of a voltage applied thereto, and
    a pair of transparent electrodes which is provided on the pair of surfaces of the liquid crystal and to which the voltage is applied, wherein at least one liquid crystal enters the first state by individually changing voltages applied to the liquid crystals via the pairs of transparent electrodes.

14. Th wavelength selecting apparatus according to claim 13, further comprising:
    a first wave plate, located between the liquid crystal cell unit and the first collimator, for converting the plurality of light signals of the diverging light beam to a plurality of circularly polarized light signals having a same optical rotatory direction as the predetermined helical direction of the liquid crystal; and
    a second wave plate, arranged opposite to where the first wave plate is provided and facing the liquid crystal cell, for returning the plurality of circularly polarized light signals which have passed the liquid crystal cell to a plurality of non-polarized light signals.

15. The wavelength selecting apparatus according to claim 13, wherein the first collimator includes:
   a collimator lens for collimating the diverging light signal to generate the collimated light beam and conversing an optically selected light signal having a specific wavelength reflected by the liquid crystal cell, and
   an optical fiber for guiding the plurality of light signals and the optical selection signal; and the wavelength selecting apparatus further comprises an optical circulator having a first terminal connected to the optical fiber, a second terminal for receiving the diverging light and a third terminal for outputting the optically selected light signal.

16. The wavelength selecting apparatus according to claim 14, further comprising a second collimator for receiving a transmission light beam which pass the liquid crystal cell unit and conversing the transmission light beam.

* * * * *